United States Patent [19]
Kelley et al.

[11] Patent Number: 5,847,981
[45] Date of Patent: Dec. 8, 1998

[54] MULTIPLY AND ACCUMULATE CIRCUIT

[75] Inventors: Brian Todd Kelley; David Mark Johnson, both of Delray Beach, Fla.

[73] Assignee: Motorola, Inc., Schaumburg, Ill.

[21] Appl. No.: 923,329

[22] Filed: Sep. 4, 1997

[51] Int. Cl.$^6$ ................................................. G06F 7/52
[52] U.S. Cl. ........................... 364/750.5; 364/736.02; 364/760.05
[58] Field of Search ................. 364/750.5, 736.02, 364/748.07, 760.05

[56] References Cited

U.S. PATENT DOCUMENTS

| | | | |
|---|---|---|---|
| 4,727,507 | 2/1988 | Miyanaga | 364/760.05 |
| 5,175,702 | 12/1992 | Beraud et al. | 364/736.02 |
| 5,220,525 | 6/1993 | Anderson et al. | 364/760.05 |
| 5,602,766 | 2/1997 | Bauer et al. | 364/750.5 |
| 5,659,495 | 8/1997 | Briggs et al. | 364/736.02 |

OTHER PUBLICATIONS

M. R. Shapiro "Design and Clocking of VLSI Multipliers", Technical Report No. CSL–TR–89–397, pp. 1–52, Computer Systems Laboratory, Stanford University, Oct. 1989.

C.S. Wallace, "A Suggestion for Fast Multipliers", IEEE Transactions on Electronic Computers, vol. EC–13, pp. 14–17, Feb. 1964.

*Primary Examiner*—David H. Malzahn
*Attorney, Agent, or Firm*—James A. Lamb

[57] ABSTRACT

A multiply accumulate circuit (600) includes a multiply accumulate reduction circuit (527) that generates P current accumulated operands during an iteration. P operand registers (582) are coupled to the multiply accumulate reduction circuit (527). A corresponding one of the P current accumulated operands is stored in each of the P operand registers (582) in place of one of the P partial accumulated operands in response to the iteration. Each of P feedback paths (593) couples one of P outputs of the P operand registers (582) to a corresponding one of P feedback inputs of the multiply accumulate reduction circuit (527). An adder (561) that is coupled to the P outputs through isolation circuits (570) generates an output (551) in N iterations that is a sum of N products, each being a product of one of a series of N multipliers and one of a series of N multiplicands.

20 Claims, 9 Drawing Sheets

MULTIPLY AND ACCUMULATE CIRCUIT

FIELD OF THE INVENTION

This invention relates in general to multiply circuits, and in particular to multiply and accumulate circuits.

BACKGROUND OF THE INVENTION

An operation commonly used by digital signal processors is a multiply accumulate (MAC) operation, which provides a MAC result that is the sum of a plurality of multiplication operations. This can be mathematically expressed as $$y = \sum_{i=1}^{N} a(i)b(i),$$

wherein a(i) is a multiplier and b(i) is a multiplicand, and a(i)b(i) is a product. This function can be quite complex to execute in a typical situation when, for example the numbers a(i) and b(i) are 16 bit numbers and 80 products are to be added each time a new digital sample of an analog signal is recovered, for example where the analog signal is a demodulated four level frequency modulated (FM) radio carrier having a symbol rate (baud rate) of 3300 bits per second.

Referring to FIG. 1, an electrical block diagram of a MAC circuit 100 used to perform the MAC operation in some prior art digital signal processors is shown. The MAC circuit 100 comprises a multiplier register 510, a multiplicand register 515, a modified Booth recoder 520, a multiply reduction tree 525, an adder 540, and an accumulator register 550. The MAC operation is performed in N iterations controlled by a digital signal processor. Each of the N total iterations is identifiable as an $i^{th}$ iteration, where i takes on values from 1 to N. During each iteration, a single product sum 528 and a single product carry 529 are generated.

During an initialization of the MAC circuit 100 at the beginning of a multiply accumulate operation, the accumulator register 550 is cleared. Prior to the beginning of the $i^{th}$ iteration, the number a(i) 501, which is a binary 16 bit number, is coupled to an input of the multiplier register 510, which is a 16 bit register. The number b(i) 503, which is also a binary 16 bit number, is coupled to an input of the multiplicand register 515, which is also a 16 bit register. The a(i) 501 and b(i) 503 are latched by signal 509 into the multiplier register 510 and the multiplicand register 515 at the beginning of the $i^{th}$ iteration from locations in random access memory, as selected by the digital signal processor of which the MAC circuit 100 is a portion. The a(i) 501 and the b(i) 503, which are numbers that are each represented by a 16 bit word, are coupled to the modified Booth recoder 520. The a(i) 501 is recoded by circuitry in the modified Booth recoder 520 into a sequence of higher radix values representing the same number, so as to reduce the quantity of values required to represent the number, in a conventional manner. These higher radix values representing a(i) 501 and the binary b(i) 503 are combined in the modified Booth recoder 520 to generate a set of nine recoded partial products, in a conventional manner. The recoded partial products are then applied to the multiply reduction tree 525, wherein they are reduced in a conventional manner to generate the single product sum 528 and the single product carry 529.

The reduction done by the multiply reduction tree 525 is done by a plurality of conventional (3,2) carry save adders (CSA's) interconnected in a conventional binary tree. A description of array interconnection of small adders circuits for the multiplication of two numbers is provided in "Design and Clocking of VLSI Multipliers" by M. R. Sanders, Technical Report No. CSL-TR-89-397, published in October 1989 by the Computer Systems Laboratory of Stanford University, Stanford, Calif., hereafter referred to as Santoro, which is hereby incorporated herein by reference. An interconnection of (3,2) CSA's in a linear array and in a binary tree are shown in FIGS. 2.6 and 2.7 of Santoro. (3,2) CSA's are a particular form of combinatorial logic adders described as (n,p) adders. Multiply arrays for performing a single multiplication a(i)b(i) by reducing a plurality of partial products to a smaller plurality of partial products without using carry propagate operations across a width of any of the partial products, using (n,p) adders interconnected in a tree are also referred to as Wallace or Dadda multiplier trees. Because the a(i) 501 and b(i) 503 are 16 bit numbers in the example being described with reference to FIG. 1, the single product sum 528 and the single product carry 529 can each be at least 31 bit numbers. It will be appreciated that because a multiply reduction tree 525 is used to produce the single product sum 528 and the single product carry 529, the time to reduce the partial products of the multiplication a(i)b(i) to the single product sum 528 and the single product carry 529 is minimized by avoiding the types of addition within the multiply reduction tree 525 that involve carry propagation across numbers at least 16 bits wide. The single product sum 528, the single product carry 529 and a previous partial summation 551 stored in the accumulator register 550 are coupled to the adder 540, which adds them together, producing a single 32 bit wide number which is $$\sum_{i=1}^{k} a(i)b(i),$$

current partial summation 541 of the $i^{th}$ iteration. The adder 540 comprises a summing array and a carry look ahead adder. It will be appreciated that, in generating the current partial summation 541, carries must be propagated across 32 bits in the carry look ahead adder. In the example where N is 80 and a(i) and b(i) are 16 bits wide, the multiply accumulate value can be as much as $80*2^{32}$, and the adder 540 must be capable of adding up to 32+ceiling(log$_2$N) bits, or 39 bits.

After the signal 509 is asserted to load the a(i) and b(i) into the multiplier register 510 and the multiplicand register 515, the logic signals propagate through the outputs of the multiplier register 510, the outputs of the multiplicand register 515, the logic of the modified Booth recoder 520, the logic of the multiply reduction tree 525, and the logic of the adder 540 at transistor gate delay speeds, generating the current partial summation. The control signal 509, which is also coupled to the accumulator register 550, is asserted periodically every $T_i$ seconds during the N iterations. The period of $T_i$ seconds allows for the worst case combination of the propagation delays through the devices itemized. The assertion of the control signal latches the current single product sum signal 528 and current single product carry signal 529 into the accumulator register 550, completing an iteration and starting a new iteration by loading a(i+1) and b(i+1) into the multiplier register 510 and the multiplicand register 515. When the Nth iteration is completed (which is also the beginning of the N+1st iteration, when the control signal 509 loads the multiplier register 510, the multiplicand register 515, and latches the accumulator register 550), the output 551 of the accumulator register 550 is the MAC result, or total value, $$y = \sum_{i=1}^{N} a(i)b(i),$$

and the MAC operation is completed. In some prior art MAC circuits, the inputs a(i) 501 and b(i) 503 are 24 bits or 32 bits, with both the sum and carry registers then being 48 bits or 64 bits, respectively. In some prior art MAC circuits, a modified Booth recorder is not used. It will be appreciated that the iteration period of $T_i$ seconds includes in this example multiply reduction tree 525 propagation delays of nine CSA's when it is a linear array, and on the order of three to four CSA propagation delays when it is Wallace Tree type array, plus the output delay of the multiplier register 510 or the multiplicand register 515 and the propagation delay of the adder 540. Since the adder 540 includes a carry propagation addition to reduce separate sum and carry results into a single number, the delay time of the adder 540 is a significant portion of $T_j$.

Referring to FIG. 2, an electrical block diagram of a MAC circuit 200 used to perform the MAC operation in some prior art digital signal processors is shown. The MAC circuit 200 differs from MAC circuit 100 only in that the multiply reduction tree 525 is replaced by a multiply accumulate reduction tree 625, the adder 540 is replaced by adder 640, and that the output 551 of the accumulator register 550 is coupled back to the multiply accumulate reduction tree (MACRT) 625 instead of the adder 640. Because the output of the accumulator register 551, which is the partial summation up until the last iteration (when it becomes the MAC result), the value of the output of accumulator register 551 can be up to 32+ceiling($\log_2 N$) bits, or 39 bits wide. Accordingly, MACRT 625 is conventionally designed using a combination of conventional (n,p) adders, such as (3,2) CSA's, to add the partial products produced from the Booth recoder 520 and the partial summation 551 in each iteration. Thus, MACRT 625 must add a single value, the partial summation 551, which is 39 bits wide, as well the intermediate partial products generated from new values of a(i) 501 and b(i) 503 applied to the MAC circuit 200 at each iteration.

Referring to FIG. 3, an electrical block diagram of a multiply circuit 300 used to perform a multiply operation in some prior art circuits is shown. The multiply circuit 300 differs from the MAC circuits 100, 200 by having a sub-iterative multiply reduction tree 524, a sub-sum register 530, a sub-carry register 535, feedback paths 517, 518, and an adder 740, and by producing a result 751 which is a multiply result of two binary values A 701 and B 703 (not a multiply accumulate result of a series of values). The sub-iterative multiply reduction tree 524 has fewer rows of (3,2) CSA's than the multiply reduction tree 525 of MAC circuit 100; in this example, 4 rows of CSA's are used in a linear arrangement instead of the 9 rows used in the MAC circuit 100. During a multiplication of a(i) and b(i), 3 sub iterations are performed using the 4 rows of CSA's; each sub-iteration adds a sub-partial sum and a sub-partial carry from a prior sub-iteration that are fed back to an input of the sub-iterative multiply reduction tree 524 from the sub-sum register 530 and the sub-carry register 535 via 32 bit wide feedback paths 517, 518; the sub-partial sum, the sub-partial carry, and 3 of the 9 partial products generated by the modified Booth recoder 520 are reduced in the sub-iterative multiply reduction tree 524, generating a new sub-partial sum and a new sub-partial carry at the outputs of the sub-sum register 530 and the sub-carry register 535. When three such sub-iterations are completed, the sub-partial sum and sub-partial carry are equivalent to the single product sum and single product carry of one iteration as described above with reference to FIG. 1.

It will be appreciated that the amount of circuitry in the sub-iterative multiply reduction tree 524 of the multiply circuit 300 is reduced in comparison to amount of circuitry in the multiply reduction tree 525 of the MAC circuit 100, but at a tradeoff of an increase in the total latency required to perform the multiple sub-iterations. A more complete description of this alternative for reducing circuitry is described in Santoro in more detail, in pages 12–14.

In another type of prior art multiply circuit having a different type of multiply reduction tree, feedback is used in a different manner to accomplish a multiplication a(i)b(i). This alternative for multiply circuitry is described in Santoro in more detail, in pages 28–32, wherein it is described in combination with a use of (4,2) CSA's. In the example of an alternative multiply circuit, nine partial products are split into two sets of nine partial products (a lower order set and a higher order set), each set having bit widths of 16 bits. Each iteration has two halves. In the first half, a first set of partial products, representing the 16 most significant bits of the 9 partial products of the set, are reduced in a summer array that handles only 16 bit wide partial products, resulting in a 16 bit wide half sum and a 16 bit wide half carry latched into a half sum and half carry register. These are fed back, as in the multiply circuit 300, but they are shifted over by 16 bits and fed back into a last row of the summer array. The last row of the summer tree must be 32 bits wide, but the other rows can be sixteen bits wide. In the second half of the iteration, the second set of partial products, representing the 16 least significant bits of the 9 partial products of the set are reduced. The result of the second half of the iteration, which are in the half sum and half carry register, are equivalent to the single product sum and single product carry as described above with reference to FIG. 1. It will be appreciated that the amount of circuitry in this alternative multiply tree is reduced in comparison to that of the multiply reduction tree 525 of MAC circuit 100.

It will be appreciated that in the prior art circuits described above, pipelining can be used to improve the throughput of the MAC circuits. For example, a set of registers can be placed between the Booth recoder 520 and the multiply reduction tree 525 (or 625) for allowing new a(i+1) 501, b(i+1) 503 to be loaded while the partial product reduction is taking place in the multiply reduction tree 525 (or 625). This increase of speed is obtained at cost of additional circuits and power consumption, and the ultimate speed is likely to be most severely constrained by the time required by the adder 540.

As digital signaling speeds increase and electronic devices that use processors that use MAC circuits become smaller, lighter, and more complex, a problem in digital signal processors is the speed and energy consumption of the MAC circuits used to perform a MAC operation, which is typically done once every time a digital sample of an analog waveform is demodulated. Speed and energy consumption of the MAC operation have been improved in prior art products by the use of the modified Booth recoder 520, which reduces the complexity of the multiply reduction tree 525, but the improvements have been limited by the speed and energy consumption of performing the addition of the final sum and carry in the adder 540 to reduce them to one binary number. For purposes of improving speed performance, the adder 540 has commonly been implemented to include a carry look ahead adder. However, this requires a large number of gates and therefore consumes more energy compared to slower adders. An alternative approach is to duplicate several parts of the circuit, each part including one sum register 530, one carry register 535, and a slower adder 540, wherein each adder 540 requires more than one iteration cycle to complete an addition. The MAC operation is then pipelined amongst the parts, by multiplexing the addition function amongst the parts. This, however, also adds energy consumption. Another factor adding energy consumption in prior art MAC circuits is asynchronous toggling of the adder 540 caused by asynchronous changes of the binary sum and binary carry.

Thus, what is needed is a MAC circuit for providing a MAC result at higher speeds with less energy consumption

DETAILED DESCRIPTION OF THE DRAWINGS

Figure 1:
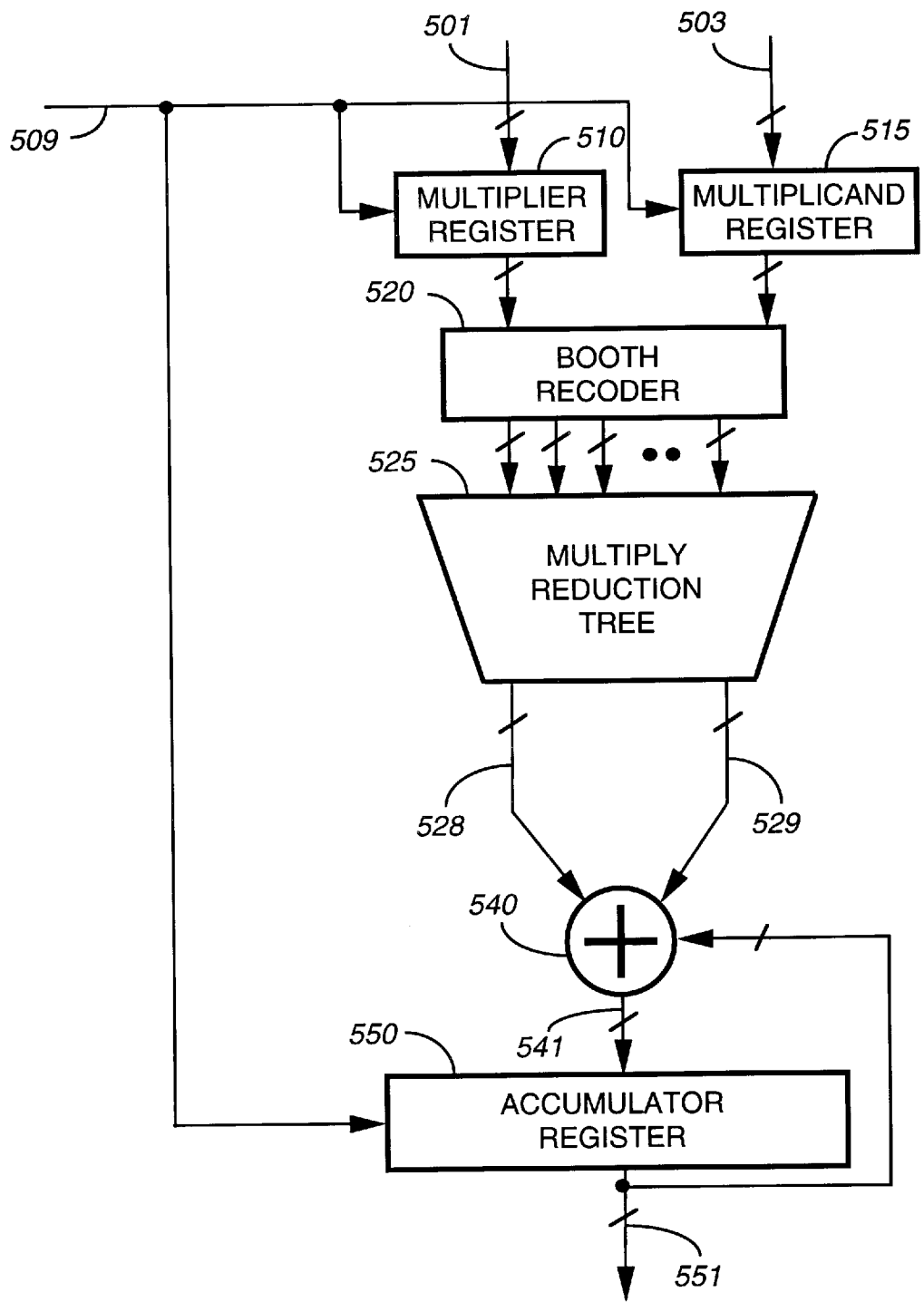
FIGS. 1–2 are electrical block diagrams of multiply accumulate circuit used to perform a multiply accumulate operation in some prior art digital signal processors.
Figure 4:
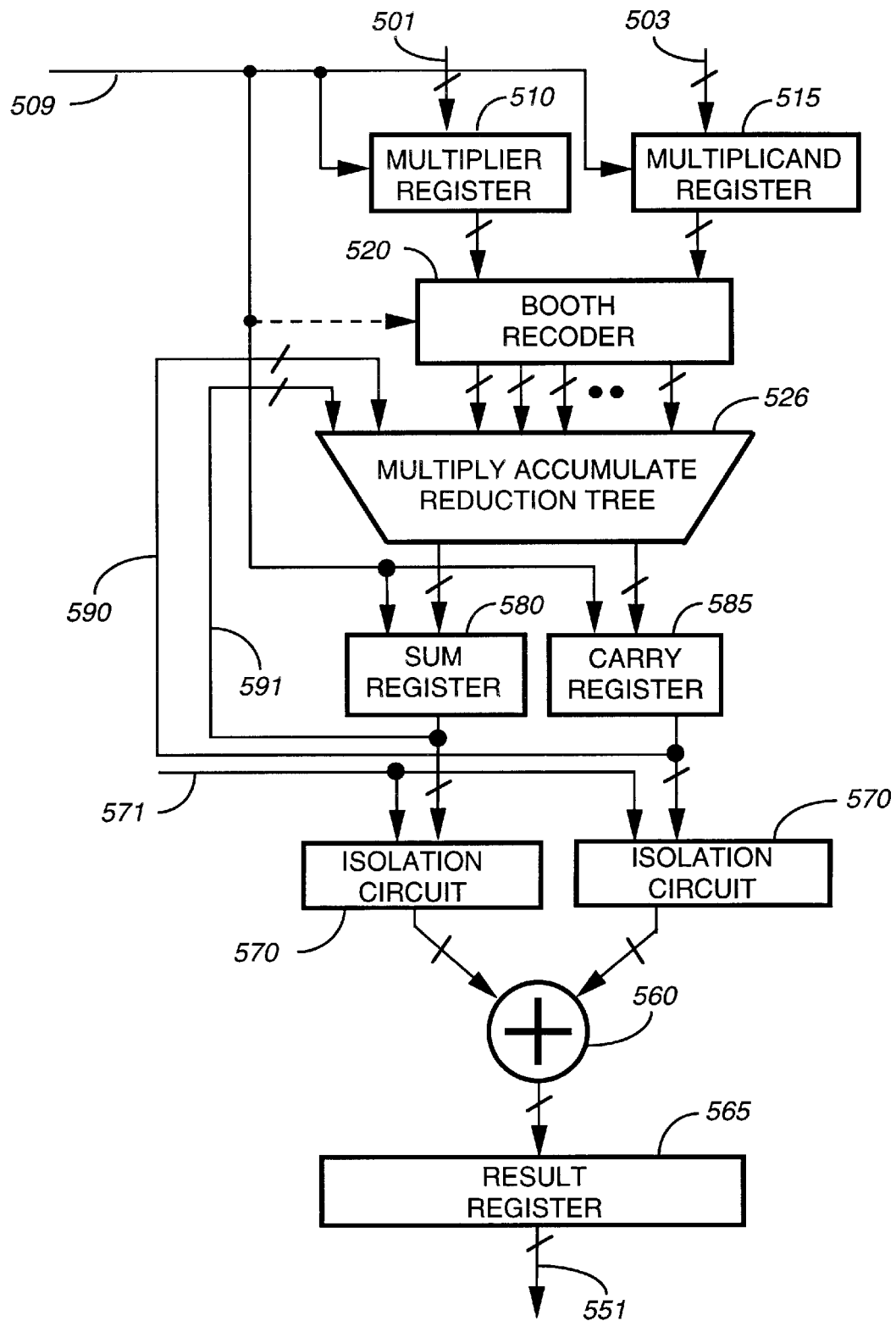
FIGS. 4–8 are electrical block diagrams of multiply accumulate (MAC) circuits used to perform a multiply accumulate operation, in accordance with the preferred and alternative embodiments of the present invention.

Referring to FIG. 4, an electrical block diagram of a multiply accumulate (MAC) circuit 400 used to perform a multiply accumulate operation is shown, in accordance with the preferred embodiment of the present invention. The MAC circuit 400 comprises a multiplier register 510, a multiplicand register 515, a modified Booth recoder 520, a multiply accumulate reduction circuit (MACRT) 526, a sum register 580, a carry register 585, two operand isolation circuits 570, an adder 560, and a result register 565. The multiplier register 510, the multiplicand register 515 and the modified Booth recoder 520 are the same devices described above with reference to FIG. 1. The MAC operation is performed in N iterations controlled by a digital signal processor 416 (FIG. 9), of which the MAC circuit 400 is a portion. In this example, N is 80. Each of the N iterations is identifiable as an $i^{th}$ iteration. During an initialization of the MAC circuit 400 at the beginning of each multiply accumulate operation, the sum register 580 and the carry register 585 are cleared. Prior to the beginning of the $i^{th}$ iteration, a(i) 501, which is a binary 16 bit number in this example, is coupled to an input of the multiplier register 510, which is a 16 bit register in this example. The number b(i) 503, which is also a binary 16 bit number in this example, is coupled to an input of the multiplicand register 515, which is also a 16 bit register in this example. The a(i) 501 and b(i) 503, which are also called the multiplier and the multiplicand, are latched into the multiplier register 510 and the multiplicand register 515 at the beginning of the $i^{th}$ iteration by signal 509. The a(i) 501 is coupled to the modified Booth recoder 520, wherein it is recoded by circuitry in the modified Booth recoder 520 into a sequence of higher radix values representing the same number, so as to reduce the quantity of values required to represent the number, in a conventional manner. These higher radix values are then used to generate a set of recoded partial products, in a conventional manner. The recoded partial products are then applied to the MACRT 526.

The result of the MAC operation can be a value as large as $N*2^{(R+D)}$, wherein N is the number of products to be accumulated, R is the bit width of the multiplier a(i) 501 and D is the bit width of the multiplicand b(i) 503. In accordance with the preferred embodiment of the present invention, 16 bits are truncated to reduce the amount of logic required in the MAC circuit 400. It will be appreciated that K could equally as well be some other value or zero. The result 551 requires the reduction and addition of up to (R+D+ceiling ($log_2$N)−K) bits. Because the MACRT 526 generates both an accumulated sum and an accumulated carry, the width of the sum register 580 and the carry register 585 must be at least (R+D+ceiling($log_2$N)−K−1) bits wide for the most general case of all possible values of a(i) and b(i), when the MACRT 526 is designed specifically to optimize the widths of the sum register 580 and the carry register 585. However, it will be appreciated that when the values of a(i) or b(i), or both, have slight restrictions placed on them, such as when the a(i) or b(i), or both, are two's complement numbers, and a(i) and b(i), or both, never have a maximum negative value, the number of bits in one or both of the sum register 580 and the carry register 585 can designed to be yet one bit smaller. On the other hand, for simplicity of design reasons (such as having the same range of significant bits in the sum register 580, carry register 585, and the MACRT 526) the sum register 580 and the carry register 585 can alternatively be designed to be one bit larger than given in the formula above. For these reasons, the width used for the sum register 580 and the carry register 585 is described herein as being essentially (R+D+ceiling($log_2$N)−K−1) bits wide, implying it is within ±1 bit of that value. In the example being used herein, R and D are 16, N is 80, and K is 16, so the width used is (32+7−1−16) bits, or 22 bits. It will be appreciated that other design choices can lead to larger amounts of bit widths for the sum register 580 and carry register 585. For example, registers having widths of multiples of 8 may be less expensive or more convenient to use during the design process, particularly if the circuit is made of standard cells or off the shelf logic. As another example of design choice, the exact choice of (n,p) adder interconnection of the MACRT 526 can result in a larger width.

Conventional design techniques are used to generate linear or tree combinations of (n,p) adders in order to provide the uniquely sized MACRT 526.

The current accumulated sum is coupled from the MACRT 526 to the sum register 580. The current accumulated carry is coupled from the MACRT 526 to the carry register 585. The current accumulated sum and current accumulated carry are stored in the sum register 580 and the carry register 585, respectively, in place of a partial accumulated sum and partial accumulated carry that are already in the sum register 580 and the carry register 585 from a prior iteration, in response to the $i^{th}$ iteration. The sum register 580 and carry register 585 comprise edge triggered flip-flops, and cannot be level sensitive. The storage is accomplished at the end of the $i^{th}$ iteration by a change of state of the signal 509 generated by the digital signal processor 416, which is coupled to a clock input of the sum register 580 and the carry register 585. This change of state is generated $T_i$ seconds (an iteration time) after the multiplier a(i) 501 and multiplicand 503 are latched into the multiplier register 510 and the multiplicand register 515. The interval $T_i$ seconds allows for propagation delays through the outputs of the multiplier register 510 (or the multiplicand register 515), the logic of the modified Booth recoder 520, and through the MACRT 526, under worst case conditions. At essentially the same time, the values a(i+1)

501 and b(i+1) 503 are latched into the multiplier register 510 and multiplicand register 515, starting the next iteration. When the current accumulated sum and the current accumulated carry are stored in the sum register 580 and the carry register 585, the sum output generated by the sum register 580 and the carry output generated by the carry register 585 are, respectively, a new partial accumulated sum and a new partial accumulated carry, which are copies of the current accumulated sum and the current accumulated carry.

It will be appreciated that the new partial accumulated sum and new partial accumulated carry at the end of the $k^{th}$ iteration together represent the partial summation $$\sum_{i=1}^{k} a(i)b(i),$$

but, in accordance with the preferred embodiment of the present invention, are not added together to generate the partial summation number during the iterations as in the prior art MAC circuits 100, 200. The new partial accumulated sum and the new partial accumulated carry are coupled from the sum register 580 and the carry register 585, respectively, to a sum feedback input and a carry feedback input of the MACRT 526 by feedback paths 590, 591, that are two sets of 38 conventional conductors. The new partial accumulated sum and the new partial accumulated carry are also coupled to the two operand isolation circuits 570. A control signal 571 coupled to the two operand isolation circuits 570 prevents any changes within the operand isolation circuits 570 while iterations prior to the Nth iteration are in process, and causes latching of the partial accumulated sum and the partial accumulated carry when the partial accumulated sum and the partial accumulated carry become a final sum and a final carry as a consequence of a completion of the N iterations of the MAC operation. In accordance with the preferred embodiment of the present invention, each of the two operand isolation circuits 570 comprises a set of 38 conventional level sensitive latches. When the control signal 571 changes state and the two operand isolation circuits 570 load the final sum and the final carry, they are added by the adder 560 and latched $T_a$ seconds after the control gate changes state into the result register 565. $T_a$ seconds is the maximum propagation time for the adder 560 to perform an addition under worst case conditions. The output 551 of the result register 565 is then the MAC result, $$y = \sum_{i=1}^{N} a(i)b(i),$$

and the MAC operation is completed.

Figure 2:
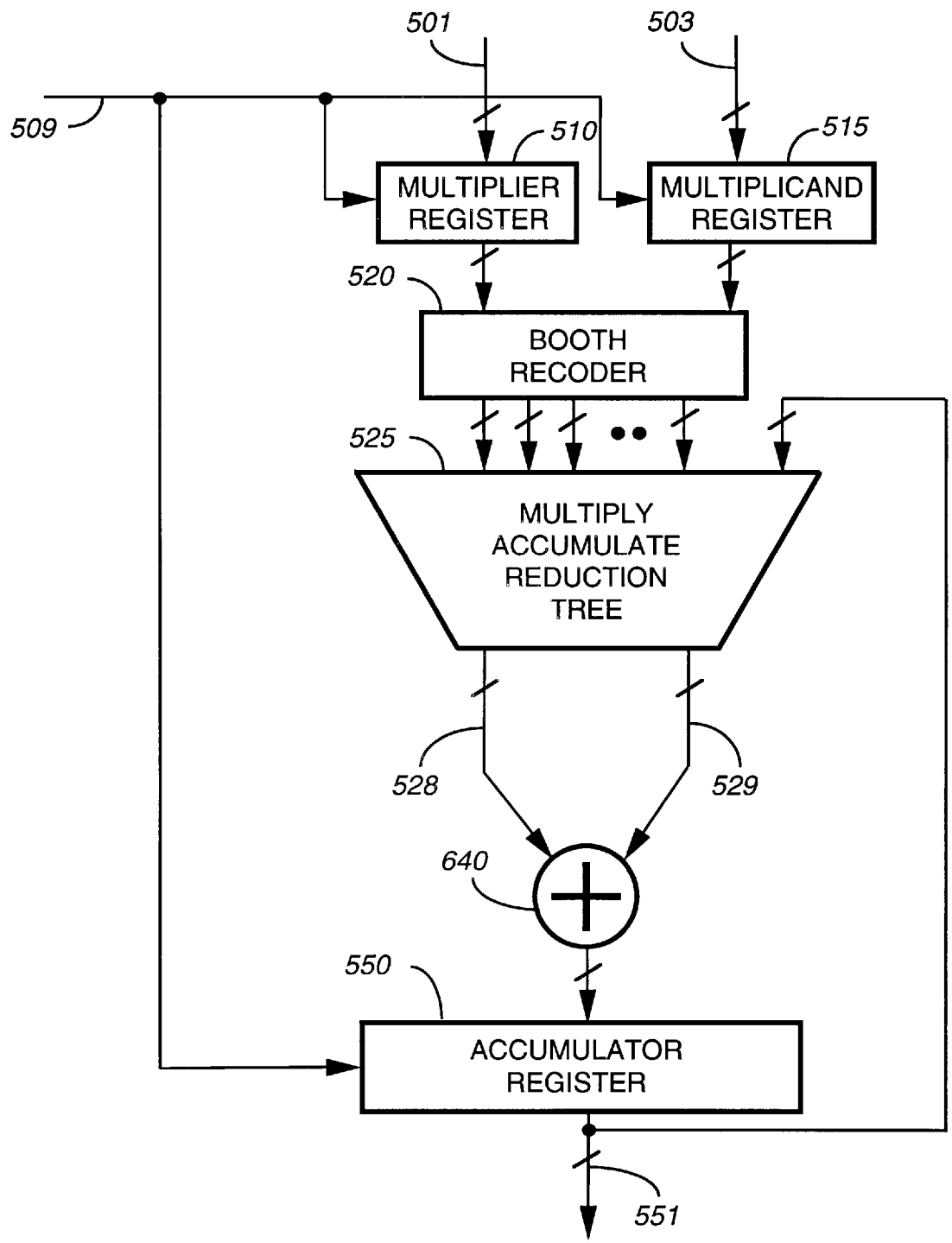

The MAC circuit 400 thus differs from the prior art MAC circuits 100, 200 described above with reference to FIGS. 1–2 in that it is designed to use feedback paths to feedback the partial accumulated sum and carry from the sum register 580 and the carry register 585 to the MACRT 526 to generate a current accumulated sum and a current accumulated carry, while avoiding the generation of an accumulated total value by uniquely using the isolation circuits 570. The feed back paths would be 38 bits wide without the truncation of 16 bits. This unique approach avoids the inclusion of the delay time of a low power prior art adder circuit 560 or the added power drain of high power, faster prior art adder circuit. In contrast, the MAC circuit 100 does not have the multiply reduction tree 525 in the feedback path at all. The MAC circuit 200 feeds back the accumulated non-final total value from the adder, using one 39 bit wide feedback path.

The MAC circuits 100, 200 use a wide adder (39 bits) to generate the accumulated non-final total value in every iteration.

The prior art multiply circuit 300 uses sub-iterative feedback of sub-sums and sub-carries, performs only a multiply function, and has no isolation circuitry.

Unlike prior art MAC circuits, $T_i$ in the MAC circuit 400 does not include any of the propagation time of the adder 560 and is therefore faster. $T_a$ is only included in the total MAC operation once, so it can be long compared to $T_j$ without significantly increasing the time required for the total MAC operation. In particular, the addition in the adder 560 can be performed while the next MAC operation is in process, as long as the addition is completed before the next MAC operation is complete. In this case, it will be appreciated that $T_a$ can be any duration less than approximately the time of all iterations required to complete the next complete multiply accumulate operation, $NT_i$ seconds. The use of such long time period allows for an adder design that consumes less energy.

A significant reduction of energy consumption is further achieved by holding the input values of the adder 560 constant except at the Nth iteration, thereby preventing extraneous transitions in the adder 560 during the first N−1 iterations.

In accordance with a variation of the preferred embodiment, the operand isolation circuits 570 are replaced by two sets of control gates which deactivate the inputs to the adder 560 during the iterations except for the last iteration, and pass but do not store the final current sum and final current product after the last iteration. The control gates can be AND gates, OR gates, and/or level sensitive latches combined in a conventional manner. In this variation, energy consumption is significantly reduced without the complexity of edge triggered flip-flops, but the addition performed by the adder 560 can only last until the sum register 580 and the carry register 585 are cleared to start a new MAC operation unless a latch or flip-flop is used. This approach is advantageous when there are multiple iteration times available between MAC operations. In some cases though, only $T_i$ seconds are available for the addition to be completed.

In another variation to the preferred embodiment of the present invention, the Booth recoder 520 includes registers (not shown in FIG. 4) into which the Booth recoded outputs are latched by the control signal 509. The dotted connection of the control signal 509 in FIG. 4 shows the coupling used for this variation. This pipelined arrangement typically reduces each iteration time $T_j$ of the MAC circuit 500 substantially, but one additional iteration is required from the time the multiplicand a(i) 501 and b(i) 503 are latched into the multiplier register 510 and multiplicand register 515 to produce the total value 551.

It will be further appreciated that the use of the modified Booth recoder 520 in both prior art MAC circuits and the MAC circuit 400 is an option determined at the time of design of the MAC circuit. The design decision is made based on the total number of transistors required in the combination of the modified Booth recoder 520 and the multiply reduction tree 525 or the MACRT 526, as well as the speed of operation and energy consumption of the modified Booth recoder 520 and the multiply reduction tree 525 or the MACRT 526.

It will be further appreciated that the two operand isolation circuits 570 can be eliminated (instead of being replaced by the control gates, as in the variation described), but that doing so causes an undesired increase in energy consumption due to transitions that occur in the adder 560 while the N iterations are in process. Such a variation could be appropriate where energy consumption is less important than the number of transistors required.

Figure 5:
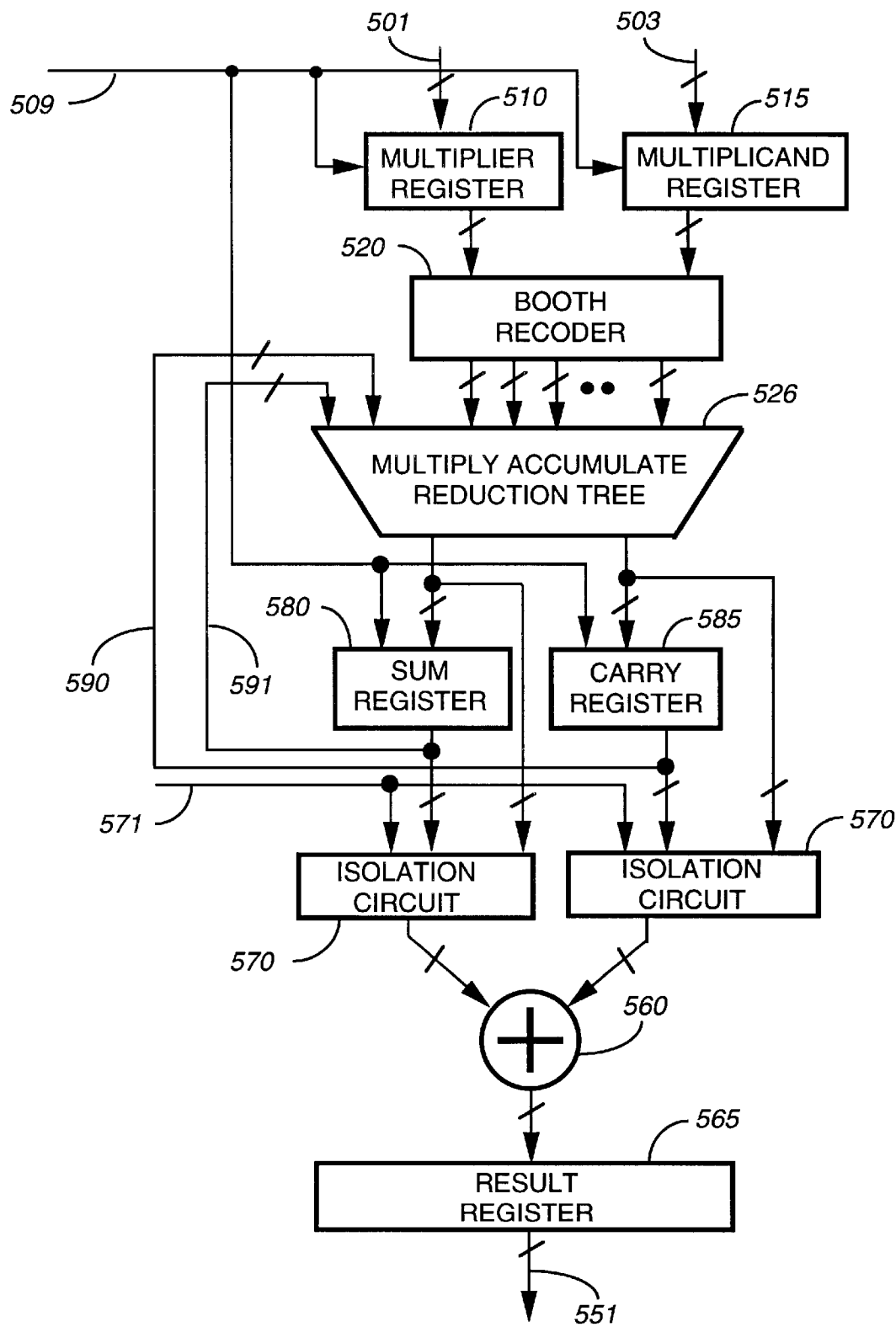

Referring to FIG. 5, an electrical block diagram of a multiply accumulate (MAC) circuit 500 used to perform a multiply accumulate operation is shown, in accordance with a first alternative embodiment of the present invention. In the MAC circuit 500, the inputs of the isolation circuits 570 are coupled to the current accumulated sum and current accumulated carry outputs of the MACRT 526 instead of the outputs of the sum register 580 and carry register 585. The direct coupling of the isolation circuits 570 to the MACRT 526 allows the control signal 571 to be asserted during the Nth iteration before the final accumulate sum and carry appear at the output of the sum register 580 and the carry register 585 at the end of the Nth iteration, thus providing the MAC result 551 earlier. This arrangement lengthens the iteration time $T_j$, but in general allows for a faster determination of the total value 551 when N=1 than the pipelined arrangement described with reference to FIG. 4. The MAC 500 also differs from the MAC circuit 400 in that the Booth recoder 520 has no latched outputs and is not coupled to the control signal 509.

Figure 6:
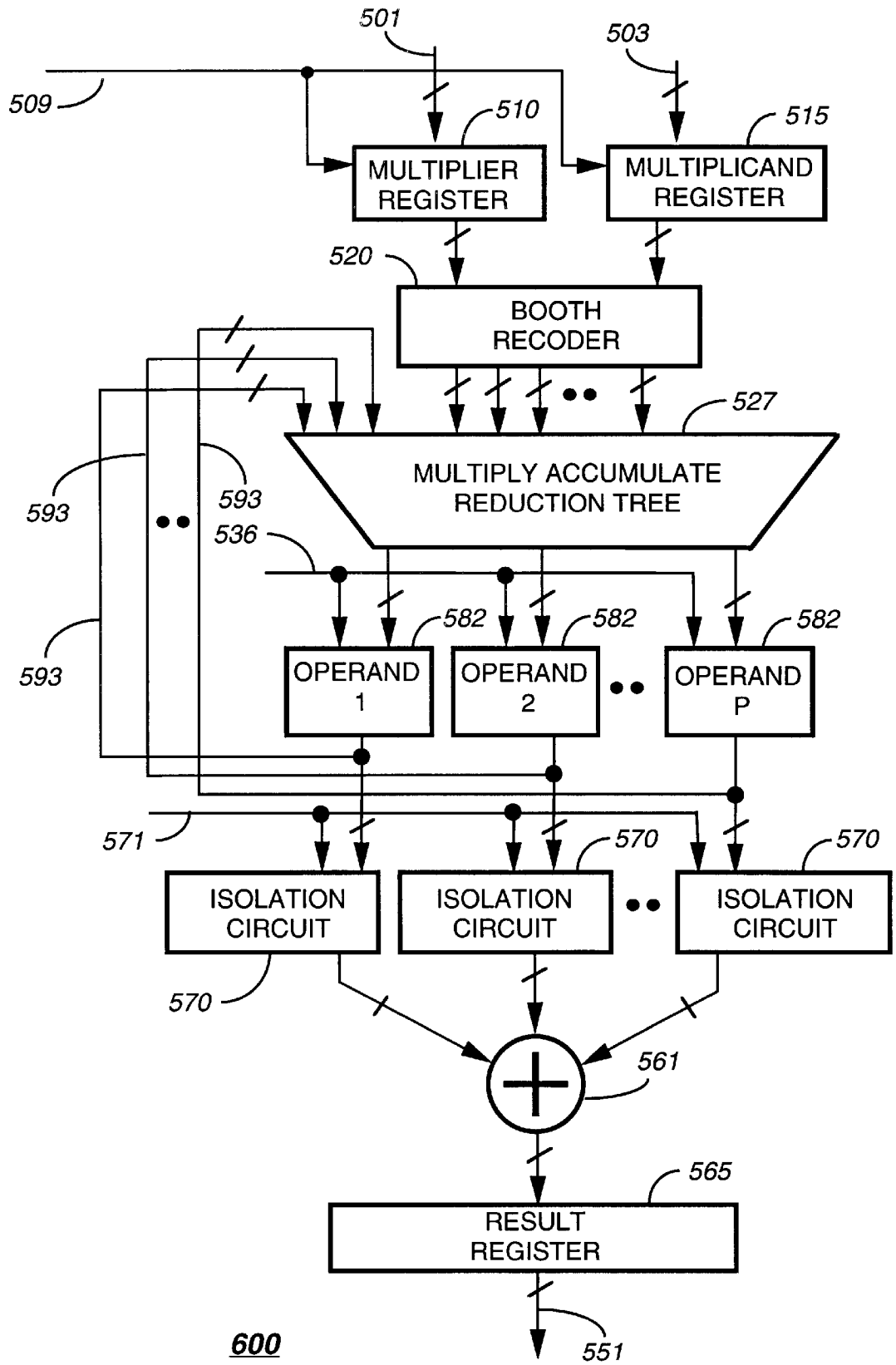

Referring to FIG. 6, an electrical block diagram of a multiply accumulate (MAC) circuit 600 used to perform a multiply accumulate operation is shown, in accordance with a second alternative embodiment of the present invention. The MAC circuit 600 comprises the multiplier register 510, the multiplicand register 515, the modified Booth recoder 520, the result register 565, and P operand isolation circuits 570 described above with reference to FIG. 4. The MAC circuit 600 further comprises a multiply accumulate reduction tree (MACRT) 527, P operand registers 582, and an adder 561. The MAC circuit 600 differs from the MAC circuit 400 essentially only in that, by design, the MACRT 527 generates P current partial products instead of the current accumulated sum and current accumulated carry that are generated by the MACRT 526. The adder 561 must add together the P final operands at the end of the Nth iteration. A design decision to have P partial products (operands) is one that trades off the amount of transistors required in the MACRT 527 and the speed of operation of the MACRT 527, versus the amount of transistors and speed required in the remainder of the MAC circuit 600. The number of transistors required in the MACRT 527 is reduced and the speed of operation of the MACRT 527 is increased when more partial products are generated (because the MACRT 527 is doing less reduction of the inputs), but the number of transistors in other parts of the MAC circuit 600 (notably the operand isolation circuits 570, the P operand registers 582 and the adder 561) is thereby increased, and the complexity of the adder 561 is increased and its speed decreased.

The MAC circuit 600 operates very similarly to the MAC circuit 400. The loading of the a(i) 501 and the b(i) 503, and the operation of the multiplier register 510, the multiplicand register 515, and the modified Booth recoder 520 are identical to the MAC circuit 400. The P current accumulated operands generated by the MACRT 527 are stored in the P operand registers by a change of state of the control signal 509 generated by the digital signal processor 416, which is coupled to a clock input of the P operand registers 582. This change of state is generated $T_j$ seconds (an iteration time) after the a(i) 501 and b(i) 503 are latched into the multiplier register 510 and multiplicand register 515. The interval $T_j$ seconds allows for logic propagation delays through the multiplier register 510, the multiplicand register 515, the modified Booth recoder 520, and the MACRT 527, under worst case conditions. As an example, when a(i) 501 and b(i) 503 are 16 bits wide and can each have any 16 bit value, and the number of products, N, being accumulated is 80, and there is no truncation, the adder 561 produces a result having up to 39 significant bits. The width of the operand registers 582 and feedback paths 593 is given essentially by (R+D+ceiling($\log_2$N)−1−K). In this example, but with 8 bits truncated, and when P is 4, and the width is essentially (16+16+7−1−8), which is 30 bits. It will be appreciated that the wording "given essentially by", which could also be stated as "essentially equal to", is because the exact value of bits can be affected for the reason described above by ±1 bit. It will be further appreciated that N is a natural number (a positive integer), R and D are natural numbers greater than 1, and K is a natural number or 0.

Figure 3:
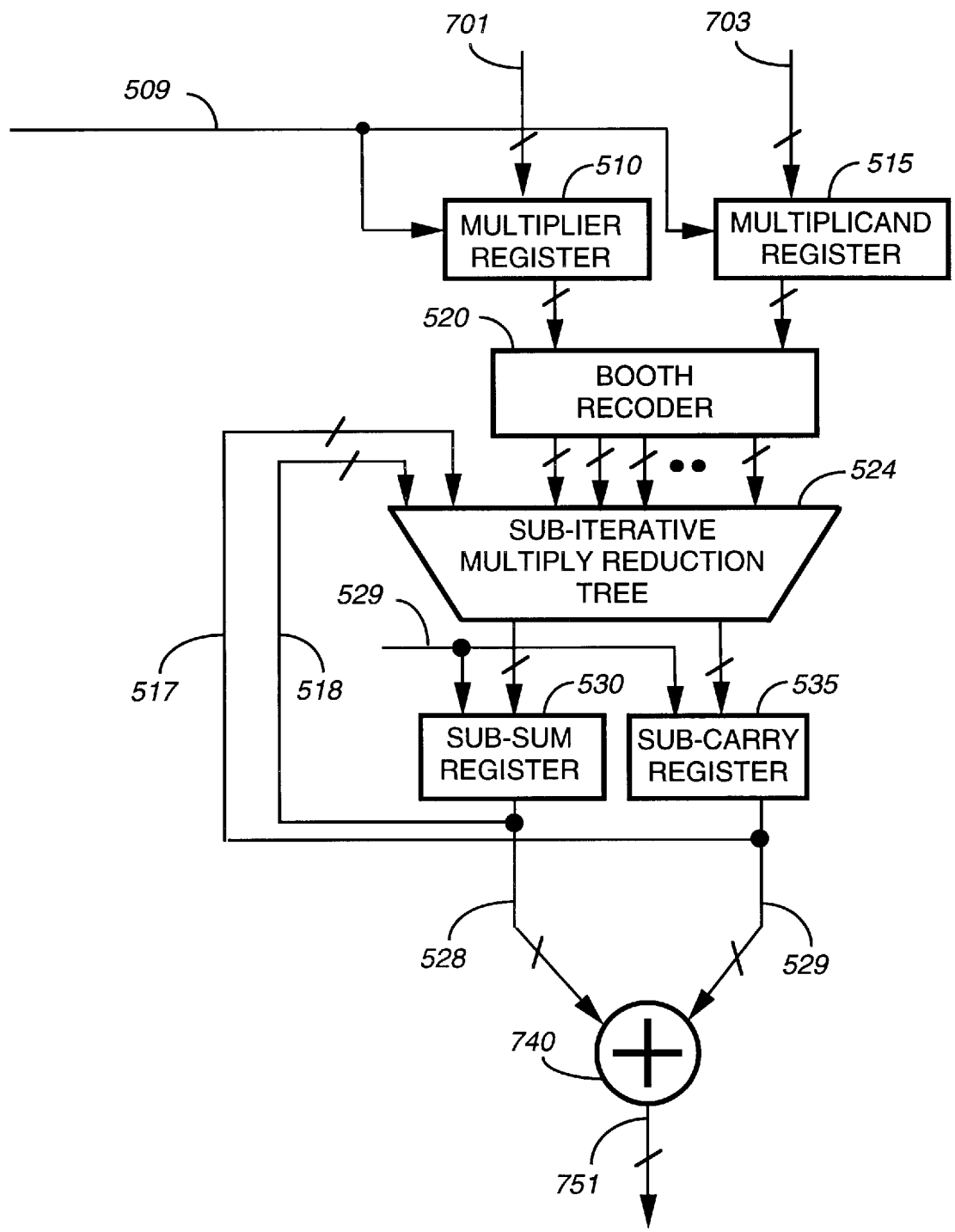
FIG. 3 is an electrical block diagram of a multiply circuit used to perform a multiply operation in some prior art circuits.

It will be further appreciated that the MACRT 527 can be comprised of circuits other than (n,p) adders. For example, the MACRT 527 could employ the multiply technique described with reference to FIG. 3, in which a sub-iterative multiply reduction tree is used to generate the partial accumulated operands. In this approach, the use of registers within the iterative multiply reduction tree is possible. In another example, the use of a simple but very fast state machine could be substituted for combinatorial logic such as the interconnection of (n,p) adders described above. Thus, the MACRT 527 is alternatively described as a multiply accumulate reduction circuit.

A description of significant aspects of the MAC circuits 400, 500, 600 follows, using the elements identified with reference to FIG. 6. Such MAC circuits generate a total value 551 which is a multiply accumulate result of N multiply operations of a series of N multipliers a(i) 501 and corresponding series of N multiplicands b(i) 503. N is a natural number. Such MAC circuits comprise a MACRT 527, P operand registers 582, P feedback paths 593, an adder 561 and P operand isolation circuits 570. P is a natural number greater than 1. The MACRT generates P current accumulated operands from a multiplier (the a(i) 501) of width R bits, a multiplicand (the b(i) 503) of width D bits, and P partial accumulated operands. R and D are natural numbers. The P partial accumulated operands are coupled to P operand feedback inputs of the MACRT. A truncation of K bits is performed in such MAC circuits. K is a natural number or 0. Each feedback path 593 and each of the P operand registers 582 has a width which is essentially (R+D+ceiling($\log_2$N)−1−K) bits wide. The width is determined, as described above, by a particular design choice of logic of the MACRT 527, the values of N and P, slight restrictions on the values of a(i) and b(i), and is within ±1 bits of the value determined by the formula. In each of the P operand registers 582, which are coupled to the MACRT 527, the P current accumulated operands are stored in place of corresponding ones of the P partial accumulated operands, in response to an iteration of the MAC operation. Each operand register 582 then generates at P outputs P new partial accumulated operands equal to the P current accumulated operands stored therein. The P feedback paths 593 couple the P new partial accumulated operands to the P operand feedback inputs of the MACRT 527. The adder 561 generates the total value from P final operands. The P operand isolation circuits 570 couple P constant values to the adder 561 during iterations other than the Nth iteration, which is a last iteration. During the Nth iteration, the P operand isolation circuits 570 couple the P final operands to the adder 561. Preferably, the MACRT 527 comprises no carry propagate adders (such as conventional ripple carry adders, carry look ahead adders, or conditional sum adders), and the adder 561 comprises one or more carry propagate adder (such as conventional ripple carry adders, carry look ahead adders, or conditional sum adders). Preferably, the MAC comprises a Booth recoder 520 that is coupled to the multiplier and multiplicand inputs, and that produces partial products coupled to the MACRT 527. The P operand isolation circuits 570 preferably comprise gates or registers. When the P operand isolation circuits 570 comprise P registers, they store P final operands such that the adder 561 generates the total value at least one iteration period past the last iteration.

A first of two variations of such circuits is one in which the P operand isolation circuits 570 are coupled between the MACRT 527 and the adder 561, and couple the P partial accumulated operands to the adder 561 when the partial accumulated operands become the P final operands during the last iteration, which is iteration N. FIG. 5 represents this variation when P is 2.

A second of two variations of such circuits is one in which each of the P operand isolation circuits 570 is coupled between one of the P operand registers 582 and the adder 561, and wherein the P isolation circuits couple the P new partial accumulated operands to the adder 561 when the P new partial accumulated operands become the P final operands as a consequence of the completion of the last iteration, which is iteration N. FIG. 4 represents this variation when P is 2.

The MAC circuit 600 when P is greater than 2 provides the same benefits of improved speed of operation and less power consumption as the MAC circuit 400, for the same reasons, and provides a design choice of the number of operands to be produced by the multiply accumulate reduction tree. The MAC circuit 600 can, like the MAC circuit 400, be designed without the operand isolation circuits 570, with the same type of tradeoffs as for the MAC circuit 400, or can be designed with control gates in place of the operand isolation circuits 570, with the same type of tradeoffs as for the MAC circuit 400.

Figure 7:
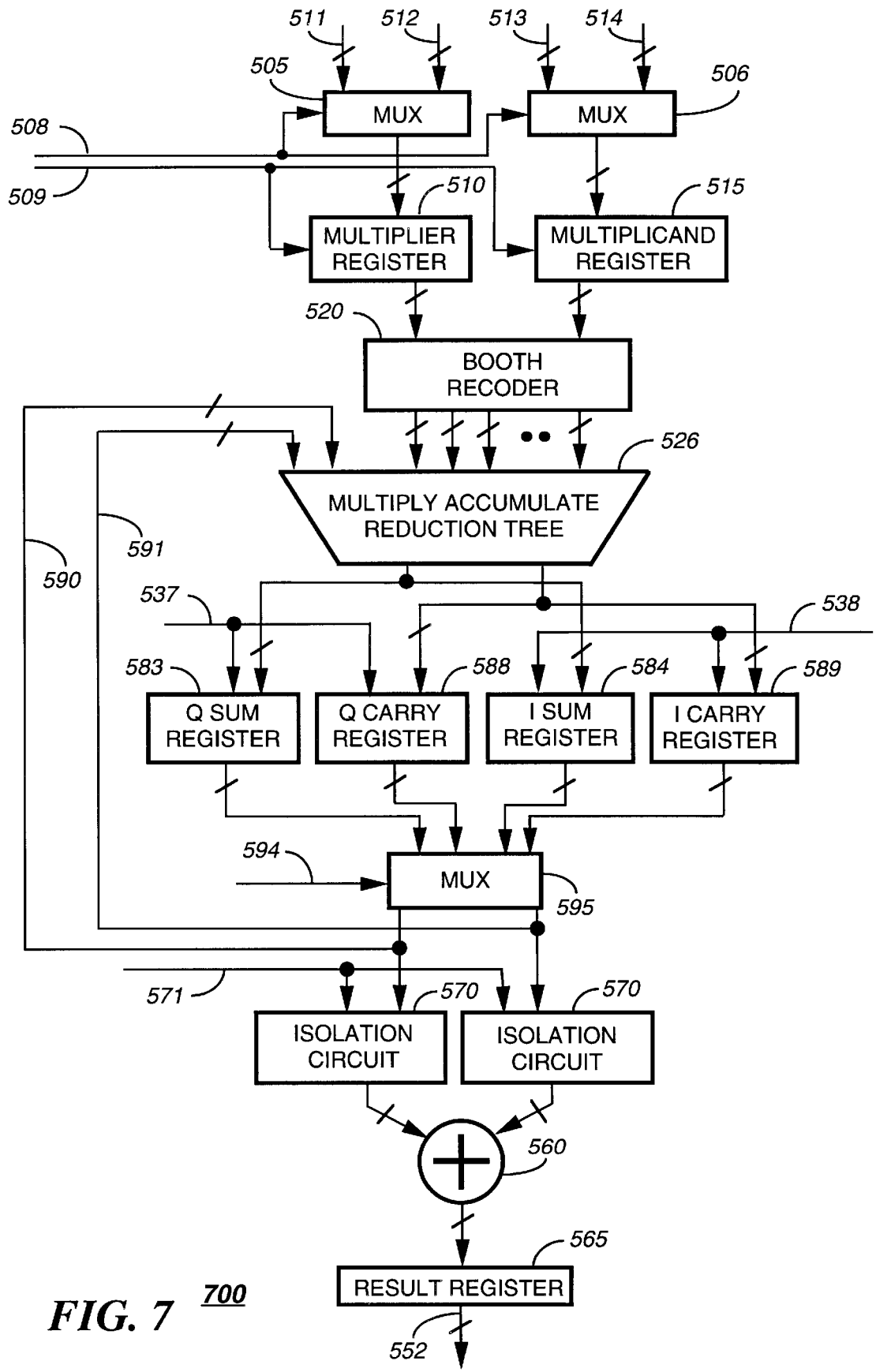

Referring to FIG. 7, an electrical block diagram of a multiply accumulate (MAC) circuit 700 used to perform a multiply accumulate operation is shown, in accordance with a third alternative embodiment of the present invention. The MAC circuit 700 is designed to process two sets of multipliers and multiplicands, {(Qa(i), Qb(i)), {Ia(i), Ib(i)} that are received in an interleaved fashion during a sample time. This is particularly useful when the two sets of multipliers and multiplicands are being received alternately, as when a received signal is being demodulated into in-phase (I) and quadrature-phase (Q) values during each sample time. The MAC circuit 700 comprises the multiplier register 510, the multiplicand register 515, the modified Booth recoder 520, the MACRT 526, the adder 560, the result register 565, and the two operand isolation circuits 570 described above with reference to FIG. 3. The MAC circuit 700 further comprises a multiplexer 505, a multiplexer 506, a multiplexer 595, a Q sum register 583, an I sum register 584, a Q carry register 588, and an I carry register 589.

The MAC operation is performed in N iterations controlled by a digital signal processor, of which the MAC circuit 700 is a portion. Each iteration has a first cycle and a second cycle. During an initialization of the MAC circuit 700, the Q sum register 583, the I sum register 584, the Q carry register 588, the I carry register 589, and the result register 565 are cleared. During an $i^{th}$ iteration, Qa(i) 511 and Ia(i) 512, which are two binary 16 bit numbers, are coupled to inputs of the multiplexer 505, which is a 16 bit 2 input channel to 1 output channel multiplexer, and Qb(i) 513 and Ib(i) 514, which are two binary 16 bit numbers, are coupled to inputs of the multiplexer 506, which is the same type as multiplexer 505. The multiplexer 595 is a 32 bit 4 input channel to 2 output channel multiplexer. A cycle clock 508 coupled to the multiplexer 505 and the multiplexer 506 causes the Qa(i) 511 and Qb(i) 513 to be selected and latched into the multiplier register 510 and multiplicand register 515 at the beginning of the first cycle of the $i^{th}$ iteration, and causes the Ia(i) 512 and Ib(i) 514 to be selected and latched into the multiplier register 510 and multiplicand register 515 at the beginning of the second cycle of the $i^{th}$ iteration. The modified Booth recoder 520 and MACRT 526 operate in the same fashion as in the MAC circuit 400.

The sum output of MACRT 526 is coupled in parallel to the Q sum register 583 and the I sum register 584, and the carry output of MACRT 526 is coupled in parallel to the Q carry register 588 and the I carry register 589. The Q sum register 583 and the Q carry register 588 are coupled to a first multiplex latch signal 537, which latches a Q current accumulated sum value generated at the sum output of MACRT 526 into the Q sum register 583, and latches a Q current accumulated carry value generated at the carry output of the MACRT 526 into the Q carry register 588 $T_i$ seconds after the Qa(i) 511 and Qb(i) 513 are selected and latched at the beginning of the first cycle of the cycle clock 508. The I sum register 584 and the I carry register 589 are coupled to a second multiplex latch signal 538, which latches an I current accumulated sum value generated at the sum output of MACRT 526 into the I sum register 584, and latches an I current accumulated carry value generated at the carry output of the MACRT 526 into the I carry register 589 $T_i$ seconds after the Ia(i) 512 and Ib(i) 514 are selected and latched at the beginning of the second cycle of the cycle clock 508. A new partial Q sum, a new partial Q carry, a new partial I sum, and a new partial I carry, are generated, respectively, at the outputs of the Q sum register 583, the Q carry register 588, the I sum register 584, and the I carry register 589, which are coupled to inputs of the multiplexer 595, which is a 32 bit, four channel to two channel multiplexer. The new partial Q sum, new partial Q carry, new partial I sum, and new partial I carry are partial accumulated operands.

During the first cycle of the $i^{th}$ iteration, the new partial Q sum and new partial Q carry are coupled to the feedback paths 590, 591 by the multiplexer 595, and during the second cycle of the $i^{th}$ iteration, the new partial I sum and new partial I carry are coupled to the feedback paths 590, 591 by the multiplexer 595. The cycle time of the multiplex clock 508 is $T_j$, wherein $T_i$ allows for logic propagation delays through the multiplexer 505, the multiplier register. The outputs of the multiplexer 595 are coupled to the two operand isolation circuits 570, which operate in conjunction with the adder 560 and the result register 565 to produce two MAC operation results, $$Q = \sum_{i=0}^{N-1} Qa(i)Qb(i) \text{ and } I = \sum_{i=0}^{N-1} Ia(i)Ib(i).$$

Q is produced at the end of the first cycle of the Nth iteration and I is produced at the end of the second cycle of the Nth iteration. The time available for performing the addition by the adder 560 is $T_i$, unless a modification is made to the MAC circuit 700.

Figure 8:
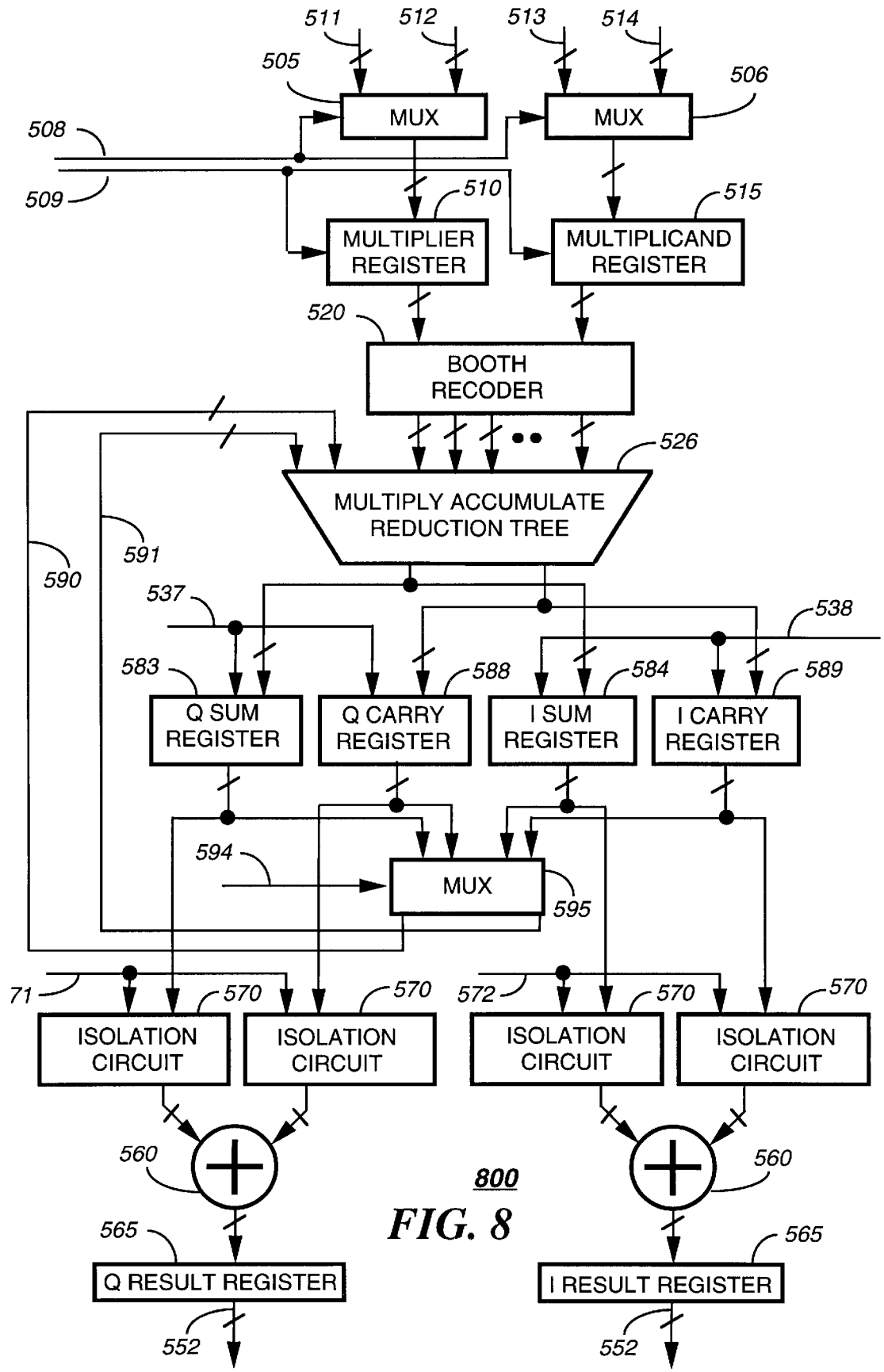

This modification is illustrated in FIG. 8, which is an electrical block diagram of a MAC circuit 800, in accordance with a third alternative embodiment of the present invention. The MAC circuit 800 is made by adding two operand isolation circuits 570, an adder 560, and a register 565 to the MAC circuit 700. The added components are intercoupled in the same way as those described with reference to FIG. 7. The inputs of two of the four operand isolation circuits 570 are coupled to the outputs of the Q sum register 583 and the Q carry register 588, and these two registers are latched by the control signal 571 at the end of the first cycle of the Nth iteration. The outputs of these two registers are coupled to one of the adders 560. The inputs of the other two latching 32 bit registers are coupled to the outputs of the Q sum register 583 and the I carry register 589, and these two registers are latched by another control signal 572 at the end of the second cycle of the Nth iteration. The outputs of these other two registers are coupled to the outputs of the other adder 560. Each of the adders 560 has an output coupled to a corresponding one of the registers 565. With this configuration, it will be appreciated that $T_a$ can be up to the time, $NT_i$, the time required for one multiply accumulate operation. Energy consumption is reduced by not having to use adders which are designed for high speed for the adders 560.

The MAC circuits 700, 800 provide the same benefits of improved speed of operation and less power consumption as the MAC circuit 400, for the same reasons, while also providing the benefit of demultiplexing a multiplexed set of multipliers and multiplicands, without requiring two modified Booth recoders and multiply accumulate reduction trees. The MAC circuit 700 can, like the MAC circuit 400, be designed without the operand isolation circuits 570, with the same type of tradeoffs as for the MAC circuit 400, or can be designed with control gates in place of the operand isolation circuits 570, with a similar benefit.

It will be appreciated that the features of the MAC circuit 700 can be generalized to produce MAC results when more than two sets of multipliers and multiplicands are received in an interleaved fashion during a sample time. The significant aspects of such a circuit, when M sets of multipliers and multiplicands are received in an interleaved fashion during a sample time, are that the circuit generates M sums of N products $$y(j) = \sum_{i=1}^{N} a(i,j)b(i,j)$$

for j=1 to M), each product being the product of one multiplier (a(i,j)) of M series of N multipliers and one multiplicand (b(i,j)) of M series of N multiplicands. The (a(i,j)) and (b(i,j)) are binary numbers having a length, of R and D bits, respectively. The MAC circuit 700 comprises a set of M sum and carry registers of length 32 for this example, represented by the Q sum register 583, the I sum register 584, the Q carry register 588 and the I carry register 589, and further comprises a 2M channel to 2 channel multiplexer circuit 59, represented by the two channel to one channel multiplexer 595 shown in FIG. 7, where the channels are 32 bits each. The set of M sum and carry registers are coupled in parallel to the MACRT 526. At a sum and carry output of each of the set of M sum and carry registers, a partial accumulated sum and partial accumulated carry are generated. The 2M channel to 2 channel multiplexer circuit is coupled to the set of M sum and carry registers and sequentially selects the partial accumulated sum and carry outputs of each of the set of M sum and carry registers during each iteration. The 2M channel to 2 channel multiplexer selectively couples the sum and carry outputs that have been selected to the sum and carry feedback paths, which are essentially (R+D+ceiling($\log_2$(N))−1−K) bits wide when a truncation of K bits is performed. The adder 560 generates at least one of the M sums of N products, having a width of (R+D+ceiling($\log_2$(N))−K) bits.

It will be appreciated that the features of MAC circuit 700 and MAC circuit 800 having M sets of multiplexed multipliers and multiplicands per iteration can be combined into one multiply accumulate circuit. The significant aspects of such a combined circuit, in addition to those cited with reference to FIG. 6, are that it generates M total values, each one of which is a multiply accumulate result of N multiply operations of one of M series of N multipliers and a corresponding one of M series of N multiplicands (i.e., for j=1 to M, each total value is given by $$y(j) = \sum_{i=1}^{N} a(i,j)b(i,j).$$

The combined multiply accumulate circuit comprises a set of M*P operand registers 582 that can be considered to include the P operand registers 582 described with reference to FIG. 6 and a M*P channel to P channel multiplexer circuit represented by the two channel to one channel multiplexer 595 of FIG. 7. The set of M*P operand registers 582 are coupled in parallel to the MACRT 527. M*P partial accumulated operands are generated at M*P operand outputs of the set of M*P operand registers 582. The multiplexer circuit, which is coupled to the set of M*P operand registers 582, sequentially selects P of the M*P operand outputs of each P of the set of M*P operand registers during each iteration and selectively couples each selected P operand outputs to the P feedback paths. The adder 560 generates at least one of the M total values.

Figure 9:
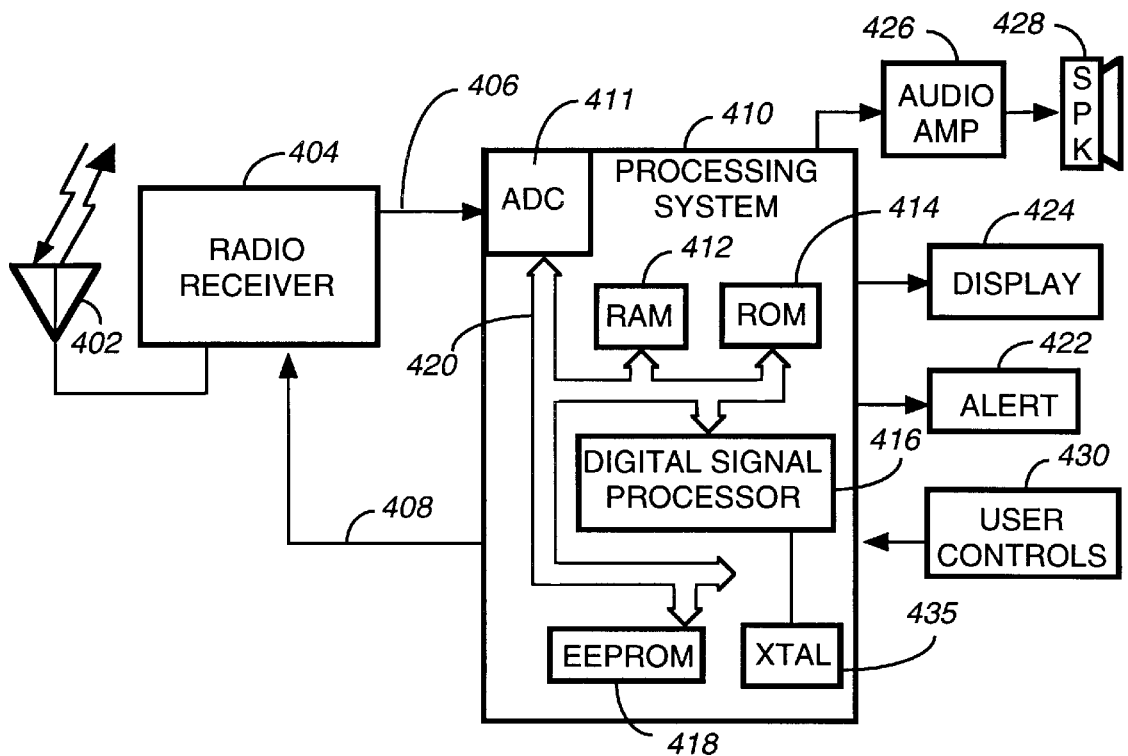
FIG. 9 is an electrical block diagram of a selective call radio which uses the MAC circuit described with reference to FIG. 4, in accordance with the preferred embodiment of the present invention.

Referring to FIG. 9, an electronic block diagram of a selective call radio 900 is shown, in accordance with the preferred embodiment of the present invention. The selective call radio 900 is representative of any electronic device that uses a processor to process digital samples, wherein a multiply accumulate operation is required, such as a telephone modem, broadcast radio receiver or infrared receiver. The selective call radio 900 comprises an antenna 402, a radio receiver 404, a processing system 410, an audio amplifier 426, a speaker 428, a display 424, an alert device 422, and user controls 430. The antenna 402 intercepts and couples a radio signal to the radio receiver 404. The radio signal includes a desired radio signal having a bandwidth, and noise. The radio receiver 404 filters portions of the noise which are outside the bandwidth, leaving a remaining signal which comprises the desired radio signal and in-band noise. The remaining signal is amplified, converted, and demodulated in a conventional manner, generating a received signal 406 that is an analog signal. The received signal 406 is coupled to the processing system 410 that comprises a digital signal processor 416, an analog to digital converter (ADC) 411, a random access memory (RAM) 412, a read only memory (ROM) 414, and an electrically erasable, programmable read only memory (EEPROM) 418, which are all intercoupled by an external bus 420 which comprises a plurality of bus signals carried on a respective plurality of external bus lines; and a crystal (XTAL) 435. The processing system 410 is coupled to the radio receiver 404 by a power control signal 408 and is further coupled to the audio amplifier 426, the display 424, the alert device 422, and the user controls 430. The crystal 435 is coupled to the digital signal processor 416 for generating a reference clock.

The received signal 406 is converted to a series of digital samples by the ADC 411 and digitally processed by the digital signal processor 416 under the control of instructions stored in the EEPROM 418. The series of digital samples includes 80 samples of a first waveform, identified as the samples a(i), where i takes a value from 0 to 79, and 80 samples of a second waveform, identified as the samples b(i), where i takes a value from 0 to 79. In order to recover data from the received signal 406, the multiply accumulate result $$y = \sum_{i=1}^{N} a(i)b(i)$$

is determined using the MAC circuit 400 (FIG. 4), which is a portion of the digital signal processor 416. The digital signal processor 416 is similar to a digital signal processor of the family of 58000 digital signal processors produced by Motorola, Inc. of Schaumburg, Ill., but with unique multiply accumulate circuits and functions included therein accordance with the description of the MAC circuit 400 given with reference to FIG. 3. When an address in the received signal 406 is decoded by the digital signal processor 416 that matches an identification of the selective call radio 900 that is stored in the EEPROM 418, the received signal 406 is further processed by the digital signal processor 416. When the received signal 406 is determined to be sufficiently error free, the digital signal processor 416 generates an alert at the alert device 422 to inform the user that a message has been received. When the received signal 406 includes alphanumeric information, the alphanumeric information is displayed on the display 424, as determined by user settings. When the received signal 406 includes audio information, the audio information is amplified by the audio amplifier 426 and coupled to the speaker 428 where it is transduced into an audible signal, as determined by user settings. User settings are entered by means of the user controls 430. The processing system 410 deactivates the radio receiver 404 via the power control signal 408 at predetermined times when no signals are expected to be received by the radio receiver 404, and activates the radio receiver 404 when signals are expected to be received.

By now it should be evident that the embodiments of the present invention described herein provide a multiply accumulate circuit that can be used in most electronic devices requiring a multiply accumulate function and which will result in faster operation with less energy consumption than prior art multiply accumulate circuits. The present invention differs from prior art in that a multiply accumulate reduction circuit is used in conjunction with isolation circuits. The multiply accumulate reduction circuit, in addition to reducing a current multiplier and multiplicand, also reduces partial accumulated sums and carries that are fed back from the output of the multiply accumulate reduction circuit, thereby avoiding the need to perform an operation at each iteration to produce a single accumulated partial sum. The present invention also uses the isolation circuits to advantageously prevent power consumption during all iterations but for the last by preventing transitions in the adder which produces the single, total multiply accumulate value during those iterations before the last iteration.

We claim:

1. A multiply accumulate (MAC) circuit that generates a total value which is a multiply accumulate result of N multiply operations of a series of N multipliers and a corresponding series of N multiplicands, comprising:

a multiply accumulate reduction circuit that generates a current accumulated sum and a current accumulated carry from a multiplier, a multiplicand, a partial accumulated sum coupled to a sum feedback input thereof, and a partial accumulated carry coupled to a carry feedback input thereof;

a sum register, coupled to the multiply accumulate reduction circuit, within which the current accumulated sum is stored in place of the partial accumulated sum in response to an iteration, and wherein the sum register generates at a sum output a new partial accumulated sum equal to the current accumulated sum stored therein;

a sum feedback path that couples the new partial accumulated sum from the sum output to the sum feedback input;

a carry register, coupled to the multiply accumulate reduction circuit, within which the current accumulated carry is stored in place of the partial accumulated carry in response to the iteration, and wherein the carry register then generates as a carry output a new partial accumulated carry equal to the current accumulated carry stored therein;

a carry feedback path that couples the new partial accumulated carry from the carry output to the carry feedback input;

an adder that generates the total value from a final sum and a final carry; and two operand isolation circuits that couple constant values to the adder during iterations other than a last iteration, and couple the final sum and final carry to the adder during the last iteration.

2. The multiply accumulate circuit according to claim 1, wherein the two operand isolation circuits are coupled between the multiply accumulate reduction circuit and the adder, and couple the partial accumulated sum and the partial accumulated carry to the adder when the partial accumulated sum and partial accumulated carry become the final sum and the final carry during the last iteration.

3. The multiply accumulate circuit according to claim 1, wherein one of the two operand isolation circuits is coupled between the sum register and the adder and the other of the two operand isolation circuits is coupled between the carry register and the adder and the two operand isolation circuits couple the new partial accumulated sum and the new partial accumulated carry to the adder when the new partial accumulated sum and new partial accumulated carry become the final sum and the final carry as a consequence of a completion of the last iteration.

4. The multiply accumulate circuit according to claim 1, wherein each multiplier in the series of N multipliers is R bits wide and each multiplicand in the series of N multiplicands is D bits wide and wherein a truncation of K bits is performed in the multiply accumulate circuit, and wherein each of the sum and carry feedbacks paths are essentially (R+D+ceiling(log$_2$N)−1−K) bits wide, wherein N, R, D are natural numbers and K is a natural number or zero.

5. The multiply accumulate circuit according to claim 1, wherein the multiply accumulate reduction circuit comprises a set of (n, p) adders interconnected in a tree.

6. The multiply accumulate circuit according to claim 1, wherein the multiply accumulate reduction circuit comprises no carry propagate adders.

7. The multiply accumulate circuit according to claim 1, wherein the adder comprises a carry propagate adder.

8. A multiply accumulate (MAC) circuit that generates a total value which is a multiply accumulate result of N multiply operations of a series of N multipliers and a corresponding series of N multiplicands, comprising:

a multiply accumulate reduction circuit that generates P current accumulated operands from a multiplier, a multiplicand, and P partial accumulated operands, wherein the P partial accumulated operands are coupled to P operand feedback inputs thereof;

P operand registers, coupled to the multiply accumulate reduction circuit, which store the P current accumulated operands in place of corresponding ones of the P partial accumulated operands in response to an iteration, and wherein the P operand registers generate at P outputs P new partial accumulated operands equal to the P current accumulated operands stored therein;

P feedback paths that couple the P new partial accumulated operands to the P operand feedback inputs;

an adder that generates the total value from P final operands; and

P operand isolation circuits that couple P constant values to the adder during iterations other than a last iteration, and couple the P final operands to the adder during the last iteration, wherein R, D, and N are natural numbers, P is a natural number greater than 2, and K is a natural number or 0.

9. The multiply accumulate circuit according to claim 8, wherein the P operand isolation circuits are coupled between the multiply accumulate reduction circuit and the adder, and couple the P partial accumulated operands to the adder when the partial accumulated operands become the P final operands during the last iteration, which is iteration N.

10. The multiply accumulate circuit according to claim 8, wherein each of the P operand isolation circuits is coupled between one of the P operand registers and the adder and wherein the P isolation circuits couple the P new partial accumulated operands to the adder when the P new partial accumulated operands become the P final operands as a consequence of a completion of the last iteration.

11. The multiply accumulate circuit according to claim 8, wherein each multiplier in the series of N multipliers is R bits wide and each multiplicand in the series of N multiplicands is D bits wide and wherein a truncation of K bits is performed in the multiply accumulate circuit, and wherein each of the operand feedback paths are essentially (R+D+ceiling($\log_2$(N))−1−K) bits wide.

12. The multiply accumulate circuit according to claim 8, wherein the multiply accumulate reduction circuit comprises a set of (n, p) adders interconnected in a tree.

13. The multiply accumulate circuit according to claim 8, wherein the multiply accumulate reduction circuit comprises no carry propagate adders.

14. The multiply accumulate circuit according to claim 8, wherein the adder comprises a carry propagate adder.

15. The multiply accumulate circuit according to claim 8, further comprising a modified Booth recoder coupled to the multiply accumulate reduction circuit that recodes each one of the series of N multipliers.

16. The multiply accumulate circuit according to claim 8, wherein the P operand isolation circuits comprise P sets of control gates.

17. The multiply accumulate circuit according to claim 8, wherein the P operand isolation circuits comprise P registers that store the P final operands, and wherein the adder generates the total value at least one iteration period past the last iteration.

18. The multiply accumulate circuit according to claim 8, wherein the total value is one of M total values, each of which is a multiply accumulate result of N multiply operations of one of M series of N multipliers and a corresponding one of M series of N multiplicands, comprising a set if M*P operand registers that includes the P operand registers, coupled in parallel to the multiply accumulate reduction circuit, wherein at M*P operand outputs of the set of M*P operand registers, M*P partial accumulated operands are generated; and a multiplexer circuit coupled to the set of M*P operand registers that sequentially selects P of the M*P operand outputs and selectively couples each selected P operand outputs to the P feedback paths, and wherein the adder generates at least one of the M total values.

19. The multiply accumulate circuit according to claim 8, wherein the multiply accumulate reduction circuit, the P operand registers, the P feedback paths, and the adder are implemented in a single integrated circuit.

20. An electronic device comprising a processor that comprises the multiply accumulate circuit according to claim 8.

* * * * *